(12) United States Patent
Thomas et al.

(10) Patent No.: US 10,370,994 B2
(45) Date of Patent: Aug. 6, 2019

(54) PRESSURE ACTIVATED SEALS FOR A GAS TURBINE ENGINE

(71) Applicants: Rolls-Royce Corporation, Indianapolis, IN (US); Rolls-Royce North American Technologies, Inc., Indianapolis, IN (US)

(72) Inventors: David J. Thomas, Brownsburg, IN (US); Joseph P. Lamusga, Indianapolis, IN (US); Ted J. Freeman, Danville, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 548 days.

(21) Appl. No.: 15/159,163

(22) Filed: May 19, 2016

(65) Prior Publication Data

US 2016/0348523 A1    Dec. 1, 2016

Related U.S. Application Data

(60) Provisional application No. 62/167,490, filed on May 28, 2015.

(51) Int. Cl.
*F01D 11/00* (2006.01)
*F01D 9/02* (2006.01)

(52) U.S. Cl.
CPC .............. *F01D 11/005* (2013.01); *F01D 9/02* (2013.01); *F05D 2240/11* (2013.01); *F05D 2270/65* (2013.01); *Y02T 50/672* (2013.01)

(58) Field of Classification Search
CPC ...... F01D 11/005; F01D 9/02; F05D 2240/11; F05D 2270/65; Y02T 50/672
USPC ................. 415/174.2, 209.2, 209.3, 137
See application file for complete search history.

(56) References Cited

U.S. PATENT DOCUMENTS

| | | | | |
|---|---|---|---|---|
| 4,199,151 A * | 4/1980 | Bartos | .................. | F01D 11/005 277/306 |
| 4,551,064 A * | 11/1985 | Pask | ........................ | F01D 11/08 415/115 |
| 4,573,866 A * | 3/1986 | Sandy, Jr. | ................ | F01D 11/08 415/116 |
| 5,188,506 A * | 2/1993 | Creevy | .................. | F01D 11/005 277/643 |
| 5,192,185 A * | 3/1993 | Leonard | .................. | F01D 11/08 415/170.1 |
| 5,716,052 A * | 2/1998 | Swensen | .............. | F16J 15/0887 277/608 |
| 5,988,975 A * | 11/1999 | Pizzi | ..................... | F01D 11/005 415/139 |
| 6,199,871 B1 * | 3/2001 | Lampes | ................ | F16J 15/0887 277/614 |
| 6,299,178 B1 | 10/2001 | Halling | | |
| 6,502,825 B2 | 1/2003 | Aksit et al. | | |
| 6,537,023 B1 * | 3/2003 | Aksit | .................... | F01D 11/005 415/191 |

(Continued)

*Primary Examiner* — David E Sosnowski
*Assistant Examiner* — Eric J Zamora Alvarez
(74) *Attorney, Agent, or Firm* — Barnes & Thornburg LLP (57) ABSTRACT

An assembly for use in a gas turbine engine is disclosed. The assembly includes a first component arranged adjacent to a second component to form a gap therebetween and a pressure activated seal that resists flow through the gap.

17 Claims, 5 Drawing Sheets

(56) References Cited

U.S. PATENT DOCUMENTS

| | | | |
|---|---|---|---|
| 6,733,234 B2 * | 5/2004 | Paprotna | F01D 11/005 277/637 |
| 6,758,653 B2 * | 7/2004 | Morrison | F01D 9/04 415/116 |
| 7,090,224 B2 | 8/2006 | Iguchi et al. | |
| 7,172,388 B2 | 2/2007 | Synnott | |
| 7,217,089 B2 | 5/2007 | Durocher et al. | |
| 7,229,246 B2 | 6/2007 | Ghasripoor et al. | |
| 7,246,995 B2 * | 7/2007 | Zborovsky | F01D 9/023 415/137 |
| 7,347,425 B2 | 3/2008 | James | |
| 7,497,443 B1 | 3/2009 | Steinetz et al. | |
| 7,527,469 B2 * | 5/2009 | Zborovsky | F01D 9/041 277/412 |
| 7,530,233 B2 * | 5/2009 | Milazar | F01D 11/005 415/134 |
| 7,736,122 B1 | 6/2010 | Stone | |
| 7,740,080 B2 | 6/2010 | Fenton | |
| 7,784,264 B2 * | 8/2010 | Weaver | F01D 9/023 60/39.37 |
| 8,016,297 B2 | 9/2011 | Heinemann et al. | |
| 8,021,103 B2 | 9/2011 | Willett, Jr. | |
| 8,210,799 B1 | 7/2012 | Rawlings | |
| 8,257,029 B2 * | 9/2012 | Habarou | F01D 11/08 415/135 |
| 8,491,259 B2 | 7/2013 | Sutcu | |
| 8,496,431 B2 * | 7/2013 | Habarou | F01D 9/04 415/170.1 |
| 8,789,833 B2 | 7/2014 | Zheng et al. | |
| 2006/0082074 A1 * | 4/2006 | Synnott | F01D 11/005 277/641 |
| 2012/0292860 A1 * | 11/2012 | Moehrle | F01D 9/023 277/640 |
| 2013/0256990 A1 * | 10/2013 | Zheng | F16J 15/0887 277/312 |
| 2014/0044529 A1 | 2/2014 | Feldmann et al. | |
| 2014/0105731 A1 | 4/2014 | Feldmann et al. | |
| 2016/0003080 A1 * | 1/2016 | Mcgarrah | F01D 11/003 415/173.1 |

* cited by examiner

PRESSURE ACTIVATED SEALS FOR A GAS TURBINE ENGINE

CROSS REFERENCE TO RELATED APPLICATIONS

This application claims priority to and the benefit of U.S. Provisional Patent Application No. 62/167,490, filed 28 May 2015, the disclosure of which is now expressly incorporated herein by reference.

FIELD OF THE DISCLOSURE

The present disclosure relates generally to seals adapted for use in gas turbine engines, and more specifically to pressure activated seals used in gas turbine engines.

BACKGROUND

Gas turbine engines are used to power aircraft, watercraft, power generators, and the like. Adjacent components in a gas turbine engine are often separated by a small gap. The small gap allows for variations in manufacturing tolerance of the adjacent components and for expansion/contraction of the components that occurs during operation of the gas turbine engine. Expansion and contraction of the adjacent components is typically caused by the selection of different materials for each component or by different temperatures experienced by each component.

The small gaps between adjacent components may be sealed to prevent the leakage of air through the small gaps during operation of the turbine engine. Seals used to block the leakage of air through the small gaps are sometimes designed to account for changes in the dimension of the gap to be closed.

SUMMARY

The present disclosure may comprise one or more of the following features and combinations thereof.

According to the present disclosure, a gas turbine engine assembly adapted to be arranged between a high pressure zone and a low pressure zone within a gas turbine engine may include a first component, a second component, and a seal. The seal may be a pressure-activated seal.

The first component may comprise metallic materials and may be formed to include a seal-support slot. The second component may comprise ceramic-matrix composite materials and may be arranged adjacent to the first component to form a gap therebetween. The pressure-activated seal may include a sheet of material having a generally uniform thickness shaped to form a support portion that extends into the seal-support slot of the first component and a sealing portion arranged in the gap between the first component and the second component. The sealing portion may be shaped to be pushed by high pressure gas on one side of the gap into contact with the second component to resist flow through the gap.

In illustrative embodiments, the sealing portion of the pressure-activated seal forms a channel arranged to open toward the high pressure zone. In some embodiments, the sealing portion of the pressure-activated seal has a generally U-shaped cross sectional profile.

In illustrative embodiments, the sealing portion of the pressure-activated seal cooperates with a portion of the first component to define a channel arranged to open toward the high pressure zone. In some embodiments, the sealing portion of the pressure-activated seal includes a first sub-portion and a second sub-portion that extends from the first sub-portion to form an angle therebetween of less than 180 degrees.

In illustrative embodiments, the support portion of the pressure-activated seal has a generally flat cross sectional profile.

In illustrative embodiments, the support portion of the pressure-activated seal forms a channel arranged to open toward the high pressure zone. In some embodiments, the support portion of the pressure-activated seal has a U-shaped cross sectional profile.

In illustrative embodiments, the support portion of the pressure-activated seal includes a first sub-portion and a second sub-portion that extends from the first sub-portion to form an angle therebetween of less than 180 degrees. In some embodiments, the seal-support slot has a shape corresponding to the first sub-portion and the second sub-portion of the support portion included in the pressure-activated seal.

According to another aspect of the present disclosure, a gas turbine engine assembly may include a first component formed to include a seal-support slot, a second component arranged adjacent to the first component to form a gap therebetween, and a pressure-activated seal. The pressure-activated seal may include a support portion that extends into the seal-support slot of the first component and a sealing portion arranged in the gap between the first component and the second component. The sealing portion of the pressure-activated seal may form at least part of a channel arranged to open toward a high pressure zone when assembled in an engine.

In illustrative embodiments, the sealing portion of the pressure-activated seal has a generally U-shaped cross sectional profile that forms the channel.

In illustrative embodiments, the sealing portion of the pressure-activated seal cooperates with a portion of the first component to define the channel. In some embodiments, the sealing portion of the pressure-activated seal includes a first sub-portion and a second sub-portion that extends from the first sub-portion to form an angle therebetween of less than 180 degrees.

In illustrative embodiments, the support portion of the pressure-activated seal has a generally flat cross sectional profile.

In illustrative embodiments, the support portion of the pressure-activated seal forms a channel arranged to open toward the high pressure zone. In some embodiments, the support portion of the pressure-activated seal has a U-shaped cross sectional profile.

In illustrative embodiments, the support portion of the pressure-activated seal includes a first sub-portion and a second sub-portion that extends from the first sub-portion to form an angle therebetween of less than 180 degrees. In some embodiments, the seal-support slot has a shape corresponding to the first sub-portion and the second sub-portion of the support portion included in the pressure-activated seal.

In illustrative embodiments, the seal-support slot is formed in an attachment feature included in the first component that engages an attachment feature of the second component to couple the first component to the second component.

According to another aspect of the present disclosure, a gas turbine engine assembly may include a first component formed to include a pressure-activating channel, a second component arranged adjacent to the first component to form a gap therebetween into which the pressure-activating channel opens, and a pressure-activated seal arranged to extend from the pressure activating channel across the gap and into engagement with the second component to resist flow through the gap. The pressure-activating channel may have a generally triangular cross sectional profile configured to guide the pressure-activated seal into contact with the second component when one side of the gap is exposed to high pressure gas during use of the assembly in a gas turbine engine.

In illustrative embodiments, the pressure-activated seal comprises a ceramic-containing rope.

In illustrative embodiments, the pressure-activated seal has a generally triangular cross sectional profile corresponding to the profile of the pressure-activating channel. In some embodiments, the pressure-activated seal comprises ceramic-containing materials.

In illustrative embodiments, the first component comprises metallic materials and the second component comprises ceramic matrix composite materials.

According to another aspect of the present disclosure, a gas turbine engine assembly may include a first component, a second component arranged adjacent to the first component to form a gap therebetween, and a pressure-activated seal that comprises a sheet of material having a generally uniform thickness shaped to form a generally W-shaped cross sectional profile. Turns of the W-shaped cross sectional profile may be arranged in the gap and arms of the W-shaped cross sectional profile extend out of the gap along a gas path formed between the first component and the second component so that the pressure-activated seal is configured such that pressurized gasses acting on the pressure-activated seal push the pressure-activated seal into contact with the first component and the second component.

In illustrative embodiments, the assembly comprises a ceramic-containing rope arranged between turns of the W-shaped cross sectional profile formed by the pressure-activated seal.

In illustrative embodiments, the first component comprises metallic materials and the second component comprises ceramic matrix composite materials.

In illustrative embodiments, the first component includes an attachment feature, the second component includes an attachment feature, the attachment feature of the second component cooperates with the attachment feature of the first component to couple the first and the second components, and the gap is formed between the attachment feature of the first component and the attachment feature of the second component. In some embodiments, one of the arms formed by the W-shaped cross sectional profile of the pressure-activated seal is engaged by the attachment feature of the first component and the attachment feature of the second component to hold the pressure-activated seal in place relative to the first component and the second component These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
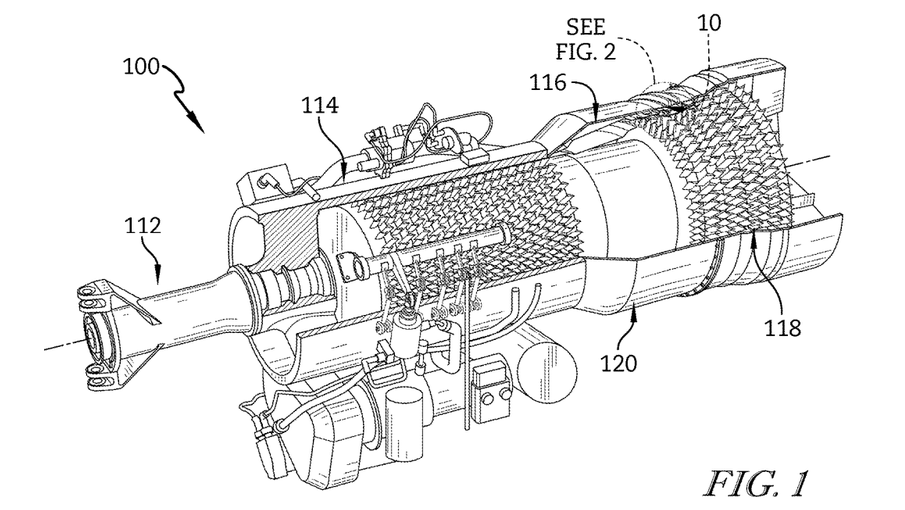
FIG. 1 is a perspective view of a gas turbine engine cut away to show that the engine includes a compressor, a combustor, and a turbine.
Figure 2:
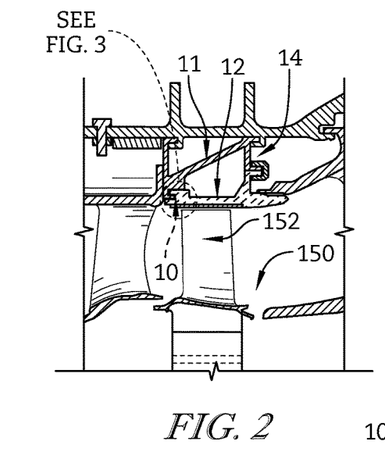
FIG. 2 is a cross sectional view of a portion of the turbine showing that a bladed wheel is surrounded by a turbine shroud assembly that includes a pressure activated seal arranged adapted to seal between components of the turbine shroud assembly as shown in FIG. 3.
Figure 3:
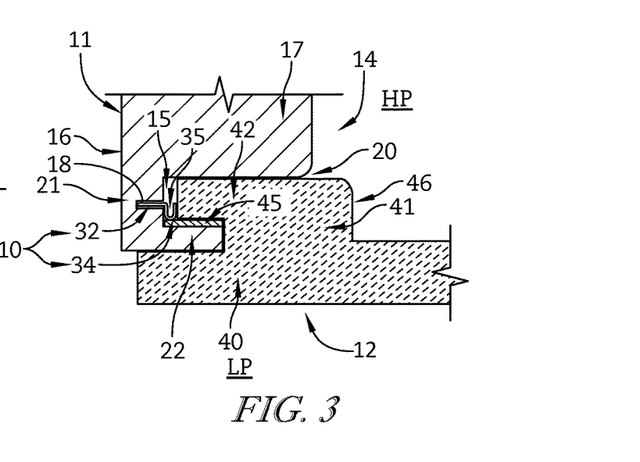
FIG. 3 is a detail view of a portion of FIG. 2 showing that the pressure activated seal is arranged between a first component (illustratively a metallic carrier) and a second component (illustratively a ceramic-matrix composite blade track segment) to block the flow of gasses from a high pressure zone to a low pressure zone.

A number of seals, including a pressure-activated seal 10, are included in a gas turbine engine 100 to resist the flow of gasses between components within the engine 100 as shown in FIGS. 1-3. Seals like pressure-activated seal 10 can control flow between components and maintain flow paths through the engine 100 so that operation of the engine 100 can be optimized.

The engine 100 illustratively includes an output shaft 112, a compressor 114, a combustor 116, and a turbine 118 all mounted to a case 120. The output shaft 112 is configured to be coupled to a propeller and is driven by the turbine 118. The compressor 114 compresses and delivers air to the combustor 116. The combustor 116 mixes fuel with the compressed air received from the compressor 114 and ignites the fuel. The hot high pressure products of the combustion reaction in the combustor 116 are directed into the turbine 118 and the turbine 118 extracts work to drive the compressor 114 and the output shaft 112. The illustrative pressure-activated seal 10 is included in the turbine 118 of the engine 100 but may also be used in other parts of the engine 100.

The exemplary pressure-activated seal 10 is arranged between a first component 11 and a second component 12 of the engine 100 as shown best in FIG. 3. In the illustrative embodiment, the first component 11 and the second component 12 are parts of a turbine shroud assembly 14. The turbine shroud assembly 14 extends around a turbine wheel assembly 150 to block combustion products from passing over blades 152 of the turbine wheel assembly 150 without pushing the blades 152 to rotate. Combustion products that are allowed to pass over the blades 152 do not push the blades 152 and such passed-over products contribute to lost performance within the engine 10. However, the pressure-activated seal 10 could be used to seal between various other components within the engine 100.

The pressure-activated seal 10 illustratively comprises a sheet of material having a generally uniform thickness shaped to form a support portion 32 and a sealing portion 34 as shown in FIG. 3. The support portion 32 is configured to locate the pressure-activated seal 10 relative to the components 11, 12 while the sealing portion 34 is shaped to be pushed into position to resist the flow of gasses between components 11, 12 by pressurized gasses acting on the pressure-activated seal 10 during operation of the engine 100.

The first component 11 of the assembly 14 is arranged adjacent to the second component 12 to form a gap 15 along a flow path 20 extending between a high pressure zone HP and a low pressure zone LP as shown in FIG. 3. The first component 11 illustratively includes an attachment feature 16, a body 17, and a seal-support slot 18. The attachment feature 16 extends radically inward from the body 17 and is configured to couple the first component 11 to the second component 12. The seal-support slot 18 receives a portion of the pressure-activated seal 10 so that the pressure-activated seal 10 is located relative to the first component 11.

The first component 11 comprises a metallic material suitable for supporting the second component 12 in the gas turbine engine 100 as suggested in FIG. 3. The first component 11 illustratively comprises a nickel-based or a cobalt-based super alloy adapted to withstand high temperatures. However, in other embodiments, the first component 11 may be made from other materials such as ceramic-containing monolithics or composites.

The attachment feature 16 of the first component 11 is illustratively an L-shaped bracket having a radially-extending leg 21 and an axially-extending leg 22 as shown in FIG. 3. In other embodiments, the attachment feature 16 could be a dovetail connector, a fastener receiving tab, or another suitable feature. In still other embodiments, the attachment feature 16 may be omitted and the second component 12 may be mounted via other means so as to form the gap 15 between the first component 11 and the second component 12.

The seal-support slot 18 illustratively extends axially into the radially-extending leg 21 of the attachment feature 16 and opens into the gap 15 between the first component 11 and the second component 12 as shown in FIG. 3. The seal-support slot 18 receives a support portion 32 of the pressure-activated seal 10 and is arranged to locate a sealing portion 34 of the pressure-activated seal 10 in the gap 15 between the first component 11 and the second component 12.

The second component 12 of the assembly 14 is illustratively configured to shield the first component 11 and other components of the engine 10 from very high temperatures in the low pressure zone LP as suggested in FIG. 3. The second component 12 includes a panel 40 and an attachment feature 46. The panel 40 separates the high pressure zone HP from the low pressure zone LP shielding the first component 11 from the low pressure zone LP. The attachment feature 46 engages the attachment feature of the first component 11 to couple the second component 12 to the first component 11.

The attachment feature 46 of the second component 12 is illustratively an L-shaped hanger having a radially-extending leg 41 and an axially-extending leg 42 as shown in FIG. 3. In other embodiments, the attachment feature 46 could be a dovetail connector, a fastener receiving tab, or another suitable feature. In still other embodiments, the attachment feature 46 may be omitted and the second component 12 may be mounted via other means so as to form the gap 15 between the first component 11 and the second component 12.

The axially-extending leg 41 of the attachment feature 46 included in the second component 12 engages the axially-extending leg 21 of the attachment feature 16 included in the first component 11 to couple the second component 12 to the first component 11. In the illustrative embodiment, the axially-extending leg 41 of the attachment feature 46 included in the second component 12 is spaced apart from the radially-extending leg 22 of the attachment feature 16 included in the first component 11 to define the gap 15 between the first component 11 and the second component 12 in which the pressure-activated seal 10 is positioned.

An optional load pad 45 may be arranged between the axially-extending leg 41 of the attachment feature 46 included in the second component 12 and the axially-extending leg 21 of the attachment feature 16 included in the first component 11. The load pad 45 may be more compliant than one or both of the first component 11 and the second component 12. In addition, the load pad 45 may block chemical interaction of the first component 11 and the second component 12 during operation of the engine 100 when temperatures are elevated.

The second component 12 comprises ceramic-matrix material suitable for use in very hot environments as suggested in FIG. 3. The second component 12 illustratively comprises silicon-carbide, silicon-carbide (SiC—SiC) ceramic-matrix composite but could comprise any other suitable ceramic containing composite or monolithic material. In some embodiments, the second component 12 may comprise metallic materials or other materials.

The pressure-activated seal 10 illustratively comprises metallic materials having a generally uniform thickness and adapted to withstand high temperatures as suggested in FIG. 3. The pressure-activated seal 10 is bent to form the support portion 32 and the sealing portion 34. The support portion 32 has a generally flat cross sectional profile that extends into seal-support slot 18. The sealing portion 34 is shaped to be pushed by high pressure gasses in the high pressure zone HP into contact with the second component 12 to resist the flow of gas through the gap 15.

In the illustrative embodiment, the sealing portion 34 of the pressure-activated seal 10 forms a radially-outwardly opening channel 35 that receives high pressure gas from the high pressure zone HP as shown in FIG. 3. The sealing portion 34 of the exemplary embodiment forms a U-shaped cross sectional profile but may have other shapes that define the channel 35.

In the specific illustrative embodiment, the first component 11 is a metallic carrier segment and the second component 12 is a ceramic-matrix composite blade track segment both included in the turbine shroud assembly 14 as shown in FIGS. 2 and 3. The first component 11 is configured to support the second component 12 relative to the turbine wheel assembly 150 and the case 120. The second component 12 is adapted to withstand high temperatures and to block combustion products from passing over blades 152 of the turbine wheel assembly 150 without pushing the blades 152 to rotate. It is notable, however, that in other embodiments the first and the second components 11, 12 might be reconfigured for use in another assembly of the engine 100 such as a combustor assembly, a vane assembly, a heat shield assembly, a combustor shroud assembly, or any other suitable assembly.

Figure 4:
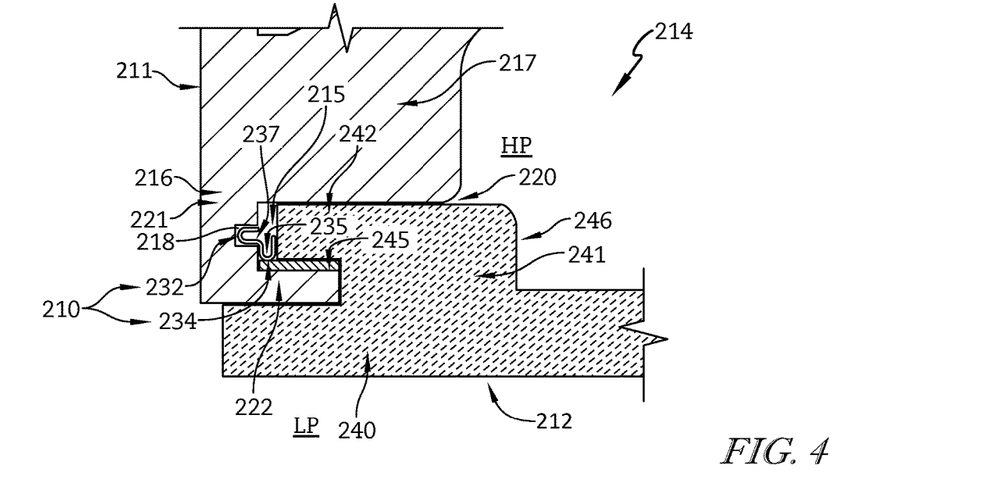
FIG. 4 is a view similar to FIG. 3 showing a second pressure activated seal arranged between a first component (illustratively a metallic carrier) and a second component (illustratively a ceramic-matrix composite blade track segment) to block the flow of gasses from a high pressure zone to a low pressure zone.

A second exemplary pressure-activated seal 210 is shown in FIG. 4. The pressure-activated seal 210 is arranged between a first component 211 and a second component 212 adapted for use in the engine 100. In the illustrative embodiment, the first component 211 and the second component 212 are parts of a turbine shroud assembly 214 arranged adjacent to one another to form a gap 215 along a flow path 220 between the first and the second components 211, 212. The pressure-activated seal 210 resists the flow of through the gap 215. However, the pressure-activated seal 210 could be used to seal between various other components within the engine 100.

The pressure-activated seal 210 illustratively comprises a sheet of material having a generally uniform thickness shaped to form a support portion 232 and a sealing portion 234 as shown in FIG. 4. The support portion 232 is configured to locate the pressure-activated seal 210 relative to the components 211, 212 while the sealing portion 234 is shaped to be pushed into position to resist the flow of gasses between components 211, 212 by pressurized gasses acting on the pressure-activated seal 210 during operation of the engine 100.

The first component 211 illustratively includes an attachment feature 216 and a seal-support slot 218. The attachment feature 216 is illustratively an L-shaped bracket having a radially-extending leg 221 and an axially-extending leg 222 that are configured to couple the first component 211 to the second component 212. The seal-support slot 218 extends axially into the radially-extending leg 221 and the support portion 234 of the pressure-activated seal 210 so that the pressure-activated seal 210 is located relative to the first component 211. In other embodiments, other forms of attachment feature 216 and/or location of the seal-support slot 218 may be incorporated into the first component 211. The first component 211 illustratively comprises a nickel-based or a cobalt-based super alloy but may be comprise other materials.

The second component 212 of the assembly 214 is illustratively configured to shield the first component 211 and other components of the engine 210 from very high temperatures in the low pressure zone LP as suggested in FIG. 4. The second component 212 includes a panel 240 and an attachment feature 246. The panel 240 separates the high pressure zone HP from the low pressure zone LP shielding the first component 211 from the low pressure zone LP. The attachment feature 246 an L-shaped hanger has a radially-extending leg 241 and an axially-extending leg 242. The axially-extending leg 242 engages the second component 212 to couple the components 211, 212 and is spaced from the radially-extending leg 222 of the attachment feature 216 included in the first component 211 to define the gap 215. The second component 212 illustratively comprises silicon-carbide, silicon-carbide (SiC—SiC) ceramic-matrix composite but could comprise any other suitable material.

An optional load pad 245 may be arranged between the axially-extending leg 241 of the attachment feature 246 included in the second component 212 and the axially-extending leg 221 of the attachment feature 216 included in the first component 211. The load pad 245 may be more compliant than one or both of the first component 211 and the second component 212. In addition, the load pad 245 may block chemical interaction of the first component 211 and the second component 212 during operation of the engine 100 when temperatures are elevated.

The pressure-activated seal 210 illustratively comprises metallic materials having a generally uniform thickness and adapted to withstand high temperatures as suggested in FIG. 4. The pressure-activated seal 210 is bent to form the support portion 232 and the sealing portion 234. The support portion 232 is shaped to be pushed by high pressure gasses in the high pressure zone HP into contact with the first component 211 to couple the seal 210 to the first component and to resist the flow of gas through the gap 215. The sealing portion 234 is shaped to be pushed by high pressure gasses in the high pressure zone HP into contact with the second component 212 to resist the flow of gas through the gap 215.

In the illustrative embodiment, the support portion 232 of the pressure-activated seal 210 forms an axially opening channel 237 facing the gap 215 that receives high pressure gas from the high pressure zone HP as shown in FIG. 4. The support portion 232 of the exemplary embodiment forms a U-shaped cross sectional profile but may have other shapes that define the channel 237.

In the illustrative embodiment, the sealing portion 234 of the pressure-activated seal 210 forms a radially-outwardly opening channel 235 that receives high pressure gas from the high pressure zone HP as shown in FIG. 4. The sealing portion 234 of the exemplary embodiment forms a U-shaped cross sectional profile but may have other shapes that define the channel 235.

Figure 5:
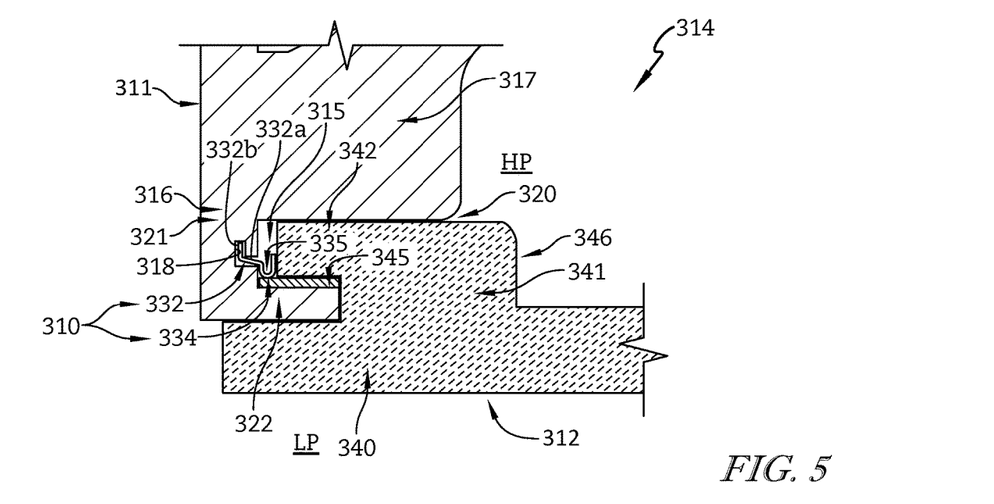
FIG. 5 is a view similar to FIGS. 3 and 4 showing a third pressure activated seal arranged between a first component (illustratively a metallic carrier) and a second component (illustratively a ceramic-matrix composite blade track segment) to block the flow of gasses from a high pressure zone to a low pressure zone.

A third exemplary pressure-activated seal 310 is shown in FIG. 5. The pressure-activated seal 310 is arranged between a first component 311 and a second component 312 adapted for use in the engine 100. In the illustrative embodiment, the first component 311 and the second component 312 are parts of a turbine shroud assembly 314 arranged adjacent to one another to form a gap 315 along a flow path 320 between the first and the second components 311, 312. The pressure-activated seal 310 resists the flow of through the gap 315. However, the pressure-activated seal 310 could be used to seal between various other components within the engine 100.

The pressure-activated seal 10 illustratively comprises a sheet of material having a generally uniform thickness shaped to form a support portion 332 and a sealing portion 334 as shown in FIG. 5. The support portion 332 is configured to locate the pressure-activated seal 310 relative to the components 311, 312 while the sealing portion 334 is shaped to be pushed into position to resist the flow of gasses between components 311, 312 by pressurized gasses acting on the pressure-activated seal 310 during operation of the engine 100.

The first component 311 illustratively includes an attachment feature 316 and a seal-support slot 318. The attachment feature 316 is illustratively an L-shaped bracket having a radially-extending leg 321 and an axially-extending leg 322 that are configured to couple the first component 311 to the second component 312. The seal-support slot 318 extends axially and radially into the radially-extending leg 321 and the support portion 334 of the pressure-activated seal 310 so that the pressure-activated seal 310 is located relative to the first component 311. In other embodiments, other forms of attachment feature 316 and/or location of the seal-support slot 318 may be incorporated into the first component 311. The first component 311 illustratively comprises a nickel-based or a cobalt-based super alloy but may be comprise other materials.

The second component 312 of the assembly 314 is illustratively configured to shield the first component 311 and other components of the engine 310 from very high temperatures in the low pressure zone LP as suggested in FIG. 5. The second component 312 includes a panel 340 and an attachment feature 346. The panel 340 separates the high pressure zone HP from the low pressure zone LP shielding the first component 311 from the low pressure zone LP. The attachment feature 346 an L-shaped hanger has a radially-extending leg 341 and an axially-extending leg 342. The axially-extending leg 342 engages the second component 312 to couple the components 311, 312 and is spaced from the radially-extending leg 322 of the attachment feature 316 included in the first component 311 to define the gap 315. The second component 312 illustratively comprises silicon-carbide, silicon-carbide (SiC—SiC) ceramic-matrix composite but could comprise any other suitable material.

An optional load pad 345 may be arranged between the axially-extending leg 341 of the attachment feature 346 included in the second component 312 and the axially-extending leg 321 of the attachment feature 316 included in the first component 311. The load pad 345 may be more compliant than one or both of the first component 311 and the second component 312. In addition, the load pad 345 may block chemical interaction of the first component 311 and the second component 312 during operation of the engine 100 when temperatures are elevated.

The pressure-activated seal 310 illustratively comprises metallic materials having a generally uniform thickness and adapted to withstand high temperatures as suggested in FIG. 5. The pressure-activated seal 310 is bent to form the support portion 332 and the sealing portion 334. The support portion 332 is received in the support slot 318 and has an axially-extending sub-portion 332A and a radially-extending sub-portion 334a. The sealing portion 334 is shaped to be pushed by high pressure gasses in the high pressure zone HP into contact with the second component 312 to resist the flow of gas through the gap 315.

In the illustrative embodiment, the sealing portion 334 of the pressure-activated seal 310 forms a radially-outwardly opening channel 335 that receives high pressure gas from the high pressure zone HP as shown in FIG. 5. The sealing portion 334 of the exemplary embodiment forms a U-shaped cross sectional profile but may have other shapes that define the channel 335.

Figure 6:
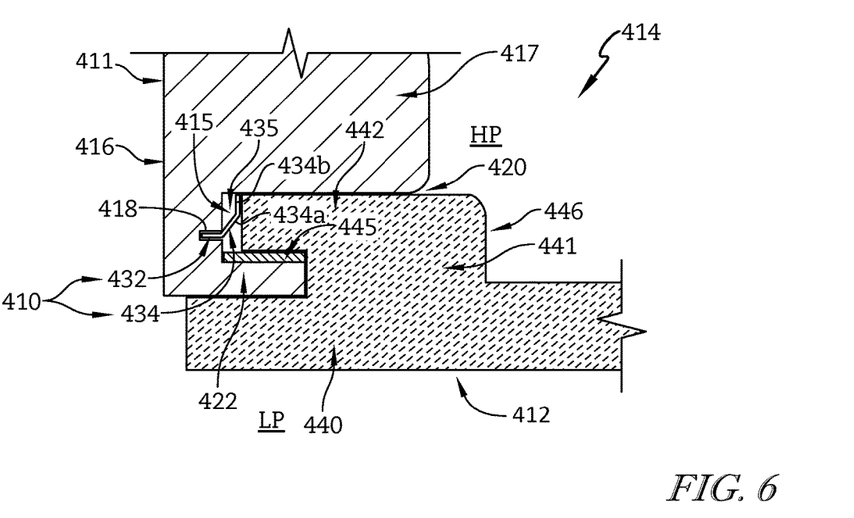
FIG. 6 is a view similar to FIGS. 3-5 showing a fourth pressure activated seal arranged between a first component (illustratively a metallic carrier) and a second component (illustratively a ceramic-matrix composite blade track segment) to block the flow of gasses from a high pressure zone to a low pressure zone.

A fourth exemplary pressure-activated seal 410 is shown in FIG. 6. The pressure-activated seal 410 is arranged between a first component 411 and a second component 412 adapted for use in the engine 100. In the illustrative embodiment, the first component 411 and the second component 412 are parts of a turbine shroud assembly 414 arranged adjacent to one another to form a gap 415 along a flow path 420 between the first and the second components 411, 412. The pressure-activated seal 10 resists the flow of through the gap 415. However, the pressure-activated seal 410 could be used to seal between various other components within the engine 100.

The pressure-activated seal 410 illustratively comprises a sheet of material having a generally uniform thickness shaped to form a support portion 432 and a sealing portion 434 as shown in FIG. 6. The support portion 432 is configured to locate the pressure-activated seal 410 relative to the components 411, 412 while the sealing portion 434 is shaped to be pushed into position to resist the flow of gasses between components 411, 412 by pressurized gasses acting on the pressure-activated seal 410 during operation of the engine 100.

The first component 411 illustratively includes an attachment feature 416 and a seal-support slot 418. The attachment feature 416 is illustratively an L-shaped bracket having a radially-extending leg 421 and an axially-extending leg 422 that are configured to couple the first component 411 to the second component 412. The seal-support slot 418 extends axially into the radially-extending leg 421 and the support portion 434 of the pressure-activated seal 410 so that the pressure-activated seal 410 is located relative to the first component 411. In other embodiments, other forms of attachment feature 416 and/or location of the seal-support slot 418 may be incorporated into the first component 411. The first component 411 illustratively comprises a nickel-based or a cobalt-based super alloy but may be comprise other materials.

The second component 412 of the assembly 414 is illustratively configured to shield the first component 411 and other components of the engine 410 from very high temperatures in the low pressure zone LP as suggested in FIG. 6. The second component 412 includes a panel 440 and an attachment feature 446. The panel 440 separates the high pressure zone HP from the low pressure zone LP shielding the first component 411 from the low pressure zone LP. The attachment feature 446 an L-shaped hanger has a radially-extending leg 441 and an axially-extending leg 442. The axially-extending leg 442 engages the second component 412 to couple the components 411, 412 and is spaced from the radially-extending leg 422 of the attachment feature 416 included in the first component 411 to define the gap 415. The second component 412 illustratively comprises silicon-carbide, silicon-carbide (SiC—SiC) ceramic-matrix composite but could comprise any other suitable material.

An optional load pad 445 may be arranged between the axially-extending leg 441 of the attachment feature 446 included in the second component 412 and the axially-extending leg 421 of the attachment feature 416 included in the first component 411. The load pad 445 may be more compliant than one or both of the first component 411 and the second component 412. In addition, the load pad 445 may block chemical interaction of the first component 411 and the second component 412 during operation of the engine 100 when temperatures are elevated.

The pressure-activated seal 410 illustratively comprises metallic materials having a generally uniform thickness and adapted to withstand high temperatures as suggested in FIG.

6. The pressure-activated seal 410 is bent to form the support portion 432 and the sealing portion 434. The support portion 432 is received in the support slot 418. The sealing portion 434 is shaped to be pushed by high pressure gasses in the high pressure zone HP into contact with the second component 412 to resist the flow of gas through the gap 415.

In the illustrative embodiment, the sealing portion 434 of the pressure-activated seal 410 cooperates with the radially-extending leg 421 of the attachment feature 416 included in the first component 411 to form a radially-outwardly opening channel 435 that receives high pressure gas from the high pressure zone HP indirectly through the fluid pathway 420 as shown in FIG. 6. The sealing portion 434 of the exemplary embodiment has an angled sub-portion 434a and a radial sub-portion 434b. The angled sub-portion 434 extends radially and axially while the radial sub-portion 434b extends only radially.

Figure 7:
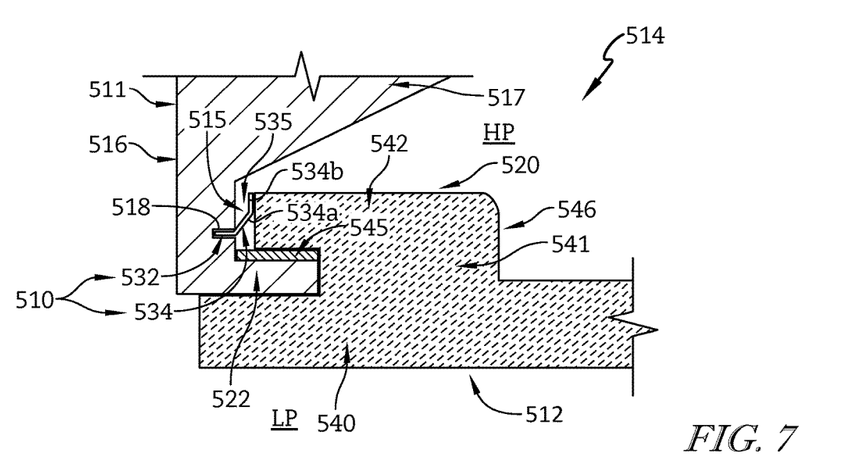
FIG. 7 is a view similar to FIGS. 3-6 showing a fifth pressure activated seal arranged between a first component (illustratively a metallic carrier) and a second component (illustratively a ceramic-matrix composite blade track segment) to block the flow of gasses from a high pressure zone to a low pressure zone.

A fifth exemplary pressure-activated seal 510 is shown in FIG. 7. The pressure-activated seal 510 is arranged between a first component 511 and a second component 512 adapted for use in the engine 100. In the illustrative embodiment, the first component 511 and the second component 512 are parts of a turbine shroud assembly 514 arranged adjacent to one another to form a gap 515 along a flow path 520 between the first and the second components 511, 512. The pressure-activated seal 510 resists the flow of through the gap 515. However, the pressure-activated seal 510 could be used to seal between various other components within the engine 100.

The pressure-activated seal 510 illustratively comprises a sheet of material having a generally uniform thickness shaped to form a support portion 532 and a sealing portion 534 as shown in FIG. 7. The support portion 532 is configured to locate the pressure-activated seal 510 relative to the components 511, 512 while the sealing portion 534 is shaped to be pushed into position to resist the flow of gasses between components 511, 512 by pressurized gasses acting on the pressure-activated seal 510 during operation of the engine 100.

The first component 511 illustratively includes an attachment feature 516 and a seal-support slot 518. The attachment feature 516 is illustratively an L-shaped bracket having a radially-extending leg 521 and an axially-extending leg 522 that are configured to couple the first component 511 to the second component 512. The seal-support slot 518 extends axially into the radially-extending leg 521 and the support portion 534 of the pressure-activated seal 510 so that the pressure-activated seal 510 is located relative to the first component 511. In other embodiments, other forms of attachment feature 516 and/or location of the seal-support slot 518 may be incorporated into the first component 511. The first component 511 illustratively comprises a nickel-based or a cobalt-based super alloy but may be comprise other materials.

The second component 512 of the assembly 514 is illustratively configured to shield the first component 511 and other components of the engine 510 from very high temperatures in the low pressure zone LP as suggested in FIG. 7. The second component 512 includes a panel 540 and an attachment feature 546. The panel 540 separates the high pressure zone HP from the low pressure zone LP shielding the first component 511 from the low pressure zone LP. The attachment feature 546 an L-shaped hanger has a radially-extending leg 541 and an axially-extending leg 542. The axially-extending leg 542 engages the second component 512 to couple the components 511, 512 and is spaced from the radially-extending leg 522 of the attachment feature 516 included in the first component 511 to define the gap 515. The second component 512 illustratively comprises silicon-carbide, silicon-carbide (SiC—SiC) ceramic-matrix composite but could comprise any other suitable material.

An optional load pad 545 may be arranged between the axially-extending leg 541 of the attachment feature 546 included in the second component 512 and the axially-extending leg 521 of the attachment feature 516 included in the first component 511. The load pad 545 may be more compliant than one or both of the first component 511 and the second component 512. In addition, the load pad 545 may block chemical interaction of the first component 511 and the second component 512 during operation of the engine 100 when temperatures are elevated.

The pressure-activated seal 510 illustratively comprises metallic materials having a generally uniform thickness and adapted to withstand high temperatures as suggested in FIG. 7. The pressure-activated seal 510 is bent to form the support portion 532 and the sealing portion 534. The support portion 532 is received in the support slot 518. The sealing portion 534 is shaped to be pushed by high pressure gasses in the high pressure zone HP into contact with the second component 512 to resist the flow of gas through the gap 515.

In the illustrative embodiment, the sealing portion 534 of the pressure-activated seal 510 cooperates with the radially-extending leg 521 of the attachment feature 516 included in the first component 511 to form a radially-outwardly opening channel 535 that receives high pressure gas from the high pressure zone HP directly from the high pressure zone HP as shown in FIG. 7. The sealing portion 534 of the exemplary embodiment has an angled sub-portion 534a and a radial sub-portion 534b. The angled sub-portion 534 extends radially and axially while the radial sub-portion 534b extends only radially.

Figure 8:
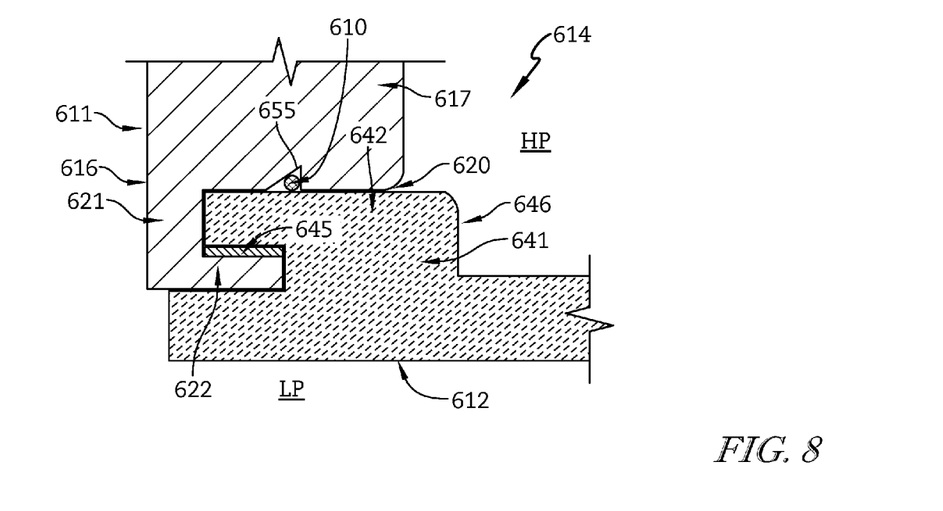
FIG. 8 is a view similar to FIGS. 3-7 showing a sixth pressure activated seal arranged between a first component (illustratively a metallic carrier) and a second component (illustratively a ceramic-matrix composite blade track segment) to block the flow of gasses from a high pressure zone to a low pressure zone.

A sixth exemplary pressure-activated seal 610 is shown in FIG. 8. The pressure-activated seal 610 is arranged between a first component 611 and a second component 612 adapted for use in the engine 100. In the illustrative embodiment, the first component 611 and the second component 612 are parts of a turbine shroud assembly 614 arranged adjacent to one another to form a gap 615 along a flow path 620 between the first and the second components 611, 612. The pressure-activated seal 610 resists the flow of through the gap 615. However, the pressure-activated seal 610 could be used to seal between various other components within the engine 100.

The pressure-activated seal 610 illustratively comprises a ceramic-containing rope or rod located in a pressure-activating channel 655 formed in the first component 611 as shown in FIG. 6. The pressure-activated seal 610 has a generally round cross sectional profile. The pressure-activating channel 655 is shaped to cause pressurized gasses to act on the pressure-activated seal 610 during operation of the engine 100.

The first component 611 illustratively includes a body 617, an attachment feature 616 and a pressure-activating channel 655. The body 617 is formed to include the pressure-activating channel 655 that opens inwardly in the radial direction and that has a generally triangular shape. The attachment feature 616 is illustratively an L-shaped bracket having a radially-extending leg 621 and an axially-extending leg 622 that are configured to couple the first component 611 to the second component 612. However, other attachment means may also be used. The first component 611 illustratively comprises a nickel-based or a cobalt-based super alloy but may be comprise other materials.

The second component 612 of the assembly 614 is illustratively configured to shield the first component 611 and other components of the engine 610 from very high temperatures in the low pressure zone LP as suggested in FIG. 6. The second component 612 includes a panel 640 and an attachment feature 646. The panel 640 separates the high pressure zone HP from the low pressure zone LP shielding the first component 611 from the low pressure zone LP. The attachment feature 646 is illustratively an L-shaped hanger has a radially-extending leg 641 and an axially-extending leg 642. However, other attachment means may also be used. The second component 612 illustratively comprises silicon-carbide, silicon-carbide (SiC—SiC) ceramic-matrix composite but could comprise any other suitable material.

An optional load pad 645 may be arranged between the axially-extending leg 641 of the attachment feature 646 included in the second component 612 and the axially-extending leg 621 of the attachment feature 616 included in the first component 611. The load pad 645 may be more compliant than one or both of the first component 611 and the second component 612. In addition, the load pad 645 may block chemical interaction of the first component 611 and the second component 612 during operation of the engine 100 when temperatures are elevated.

Figure 9:
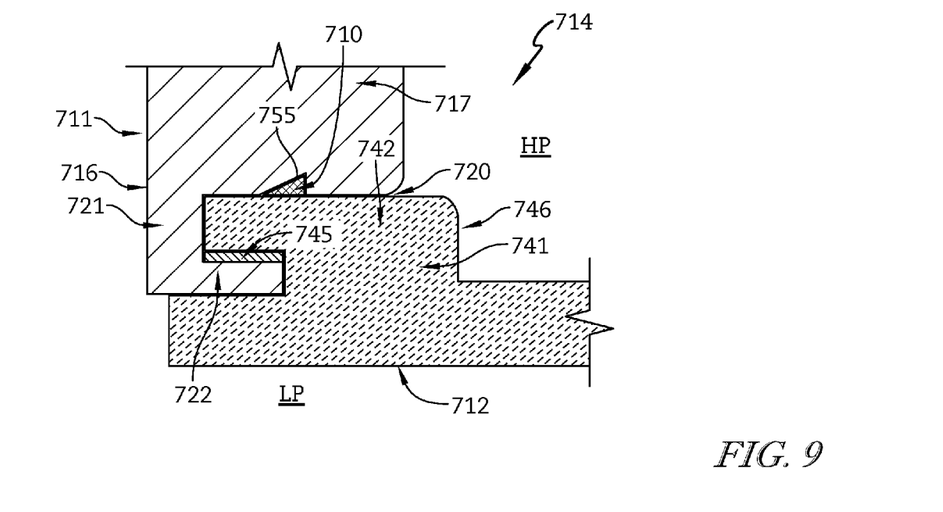
FIG. 9 is a view similar to FIGS. 3-8 showing a seventh pressure activated seal arranged between a first component (illustratively a metallic carrier) and a second component (illustratively a ceramic-matrix composite blade track segment) to block the flow of gasses from a high pressure zone to a low pressure zone.

A seventh exemplary pressure-activated seal 710 is shown in FIG. 9. The pressure-activated seal 710 is arranged between a first component 711 and a second component 712 adapted for use in the engine 100. In the illustrative embodiment, the first component 711 and the second component 712 are parts of a turbine shroud assembly 714 arranged adjacent to one another to form a gap 715 along a flow path 720 between the first and the second components 711, 712. The pressure-activated seal 710 resists the flow of through the gap 715. However, the pressure-activated seal 710 could be used to seal between various other components within the engine 100.

The pressure-activated seal 710 illustratively comprises a ceramic-containing member in a pressure-activating channel 755 formed in the first component 711 as shown in FIG. 6. The pressure-activated seal 710 has a generally triangular cross sectional profile. The pressure-activating channel 755 is shaped to cause pressurized gasses to act on the pressure-activated seal 710 during operation of the engine 100.

The first component 711 illustratively includes a body 717, an attachment feature 716 and a pressure-activating channel 755. The body 717 is formed to include the pressure-activating channel 755 that opens inwardly in the radial direction and that has a generally triangular shape corresponding to the shape of the pressure-activated seal 710. The attachment feature 716 is illustratively an L-shaped bracket having a radially-extending leg 721 and an axially-extending leg 722 that are configured to couple the first component 711 to the second component 712. However, other attachment means may also be used. The first component 711 illustratively comprises a nickel-based or a cobalt-based super alloy but may be comprise other materials.

The second component 712 of the assembly 714 is illustratively configured to shield the first component 711 and other components of the engine 710 from very high temperatures in the low pressure zone LP as suggested in FIG. 6. The second component 712 includes a panel 740 and an attachment feature 746. The panel 740 separates the high pressure zone HP from the low pressure zone LP shielding the first component 711 from the low pressure zone LP. The attachment feature 746 is illustratively an L-shaped hanger has a radially-extending leg 741 and an axially-extending leg 742. However, other attachment means may also be used. The second component 712 illustratively comprises silicon-carbide, silicon-carbide (SiC—SiC) ceramic-matrix composite but could comprise any other suitable material.

An optional load pad 745 may be arranged between the axially-extending leg 741 of the attachment feature 746 included in the second component 712 and the axially-extending leg 721 of the attachment feature 716 included in the first component 711. The load pad 745 may be more compliant than one or both of the first component 711 and the second component 712. In addition, the load pad 745 may block chemical interaction of the first component 711 and the second component 712 during operation of the engine 100 when temperatures are elevated.

Figure 10:
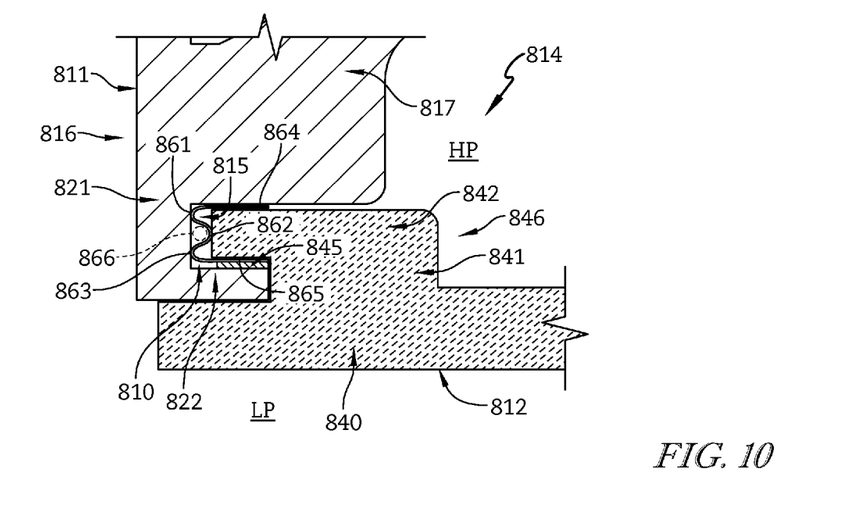
FIG. 10 is a view similar to FIGS. 3-9 showing a eighth pressure activated seal arranged between a first component (illustratively a metallic carrier) and a second component (illustratively a ceramic-matrix composite blade track segment) to block the flow of gasses from a high pressure zone to a low pressure zone.

An eighth exemplary pressure-activated seal 810 is shown in FIG. 10. The pressure-activated seal 810 is arranged between a first component 811 and a second component 812 adapted for use in the engine 100. In the illustrative embodiment, the first component 811 and the second component 812 are parts of a turbine shroud assembly 814 arranged adjacent to one another to form a gap 815 along a flow path 820 between the first and the second components 811, 812. The pressure-activated seal 810 resists the flow of through the gap 815. However, the pressure-activated seal 810 could be used to seal between various other components within the engine 100.

The pressure-activated seal 810 illustratively comprises a sheet of material having a generally uniform thickness shaped to form a generally W-shaped cross-sectional profile as shown in FIG. 10. The pressure-activating seal 810 is shaped to cause pressurized gasses acting on the seal 810 to push the seal into contact with the components 810, 811.

The first component 811 illustratively includes a body 817 and an attachment feature 816. The attachment feature 816 is illustratively an L-shaped bracket having a radially-extending leg 821 and an axially-extending leg 822 that are configured to couple the first component 811 to the second component 812. However, other attachment means may also be used. The first component 811 illustratively comprises a nickel-based or a cobalt-based super alloy but may be comprise other materials.

The second component 812 of the assembly 814 is illustratively configured to shield the first component 811 and other components of the engine 810 from very high temperatures in the low pressure zone LP as suggested in FIG. 6. The second component 812 includes a panel 840 and an attachment feature 846. The panel 840 separates the high pressure zone HP from the low pressure zone LP shielding the first component 811 from the low pressure zone LP. The attachment feature 846 is illustratively an L-shaped hanger has a radially-extending leg 841 and an axially-extending leg 842. However, other attachment means may also be used. The second component 812 illustratively comprises silicon-carbide, silicon-carbide (SiC—SiC) ceramic-matrix composite but could comprise any other suitable material.

An optional load pad 845 may be arranged between the axially-extending leg 841 of the attachment feature 846 included in the second component 812 and the axially-extending leg 821 of the attachment feature 816 included in the first component 811. The load pad 845 may be more compliant than one or both of the first component 811 and the second component 812. In addition, the load pad 845 may block chemical interaction of the first component 811 and the second component 812 during operation of the engine 100 when temperatures are elevated.

The pressure-activated seal 810 is arranged so that turns 861, 862, 863 of the W-shaped cross sectional profile are arranged axially between the radially-extending leg 821 of the attachment feature 816 included in the first component 811 and the axially-extending leg 842 of the attachment feature 846 as shown in the second component 812 as shown in FIG. 10. In addition, outer arms 864, 865 of the W-shaped cross sectional profile extend axially along the axially-extending leg 842 of the attachment feature 846 included in the second component 812. In some embodiments, an optional rope seal 866 may be held in place by a middle turn 862 of the W-shaped cross sectional profile so that the rope seal 866 engages the first component 811 as shown in FIG. 10.

Figure 11:
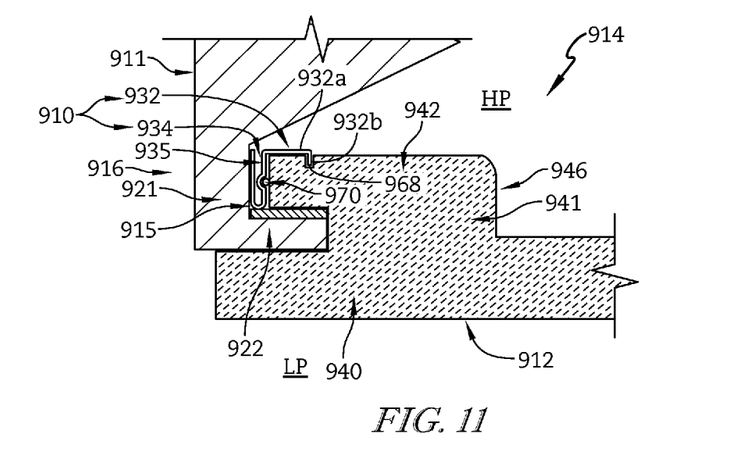
FIG. 11 is a view similar to FIGS. 3-10 showing a ninth pressure activated seal arranged between a first component (illustratively a metallic carrier) and a second component (illustratively a ceramic-matrix composite blade track segment) to block the flow of gasses from a high pressure zone to a low pressure zone.

A ninth exemplary pressure-activated seal 910 is shown in FIG. 11. The pressure-activated seal 910 is arranged between a first component 911 and a second component 912 adapted for use in the engine 100. In the illustrative embodiment, the first component 911 and the second component 912 are parts of a turbine shroud assembly 914 arranged adjacent to one another to form a gap 915 along a flow path 920 between the first and the second components 911, 912. The pressure-activated seal 910 resists the flow of through the gap 915. However, the pressure-activated seal 910 could be used to seal between various other components within the engine 100.

The pressure-activated seal 910 illustratively comprises a sheet of material having a generally uniform thickness shaped to form a support portion 932 and a sealing portion 934 as shown in FIG. 5. The support portion 932 is configured to locate the pressure-activated seal 910 relative to the components 911, 912 while the sealing portion 934 is shaped to be pushed into position to resist the flow of gasses between components 911, 912 by pressurized gasses acting on the pressure-activated seal 910 during operation of the engine 100.

The first component 911 illustratively includes an attachment feature 916 and a body 917. The attachment feature 916 is illustratively an L-shaped bracket having a radially-extending leg 921 and an axially-extending leg 922 that are configured to couple the first component 911 to the second component 912. The attachment feature 916 extends radially-inwardly from the body 917. In other embodiments, other forms of attachment feature 916 and/or location of the seal-support slot 918 may be incorporated into the first component 911. The first component 911 illustratively comprises a nickel-based or a cobalt-based super alloy but may be comprise other materials.

The second component 912 of the assembly 914 is illustratively configured to shield the first component 911 and other components of the engine 910 from very high temperatures in the low pressure zone LP as suggested in FIG. 5. The second component 912 includes a panel 940 and an attachment feature 946. The panel 940 separates the high pressure zone HP from the low pressure zone LP shielding the first component 911 from the low pressure zone LP. The attachment feature 946 an L-shaped hanger has a radially-extending leg 941 and an axially-extending leg 942. The axially-extending leg 942 engages the second component 912 to couple the components 911, 912 and is spaced from the radially-extending leg 922 of the attachment feature 916 included in the first component 911 to define the gap 915. The second component 912 illustratively comprises silicon-carbide, silicon-carbide (SiC—SiC) ceramic-matrix composite but could comprise any other suitable material.

An optional load pad 945 may be arranged between the axially-extending leg 941 of the attachment feature 946 included in the second component 912 and the axially-extending leg 921 of the attachment feature 916 included in the first component 911. The load pad 945 may be more compliant than one or both of the first component 911 and the second component 912. In addition, the load pad 945 may block chemical interaction of the first component 911 and the second component 912 during operation of the engine 100 when temperatures are elevated.

The pressure-activated seal 910 illustratively comprises metallic materials having a generally uniform thickness and adapted to withstand high temperatures as suggested in FIG. 5. The pressure-activated seal 910 is bent to form the support portion 932 and the sealing portion 934. The support portion 932 has an axially-extending sub-portion 932A and a radially-extending sub-portion 934a. The radially-extending sub-portion 934A extends into a support slot 968 formed in the axially-extending leg 942 of the attachment feature 946 included in the second component 912. The sealing portion 934 is shaped to be pushed by high pressure gasses in the high pressure zone HP into contact with the second component 912 to resist the flow of gas through the gap 915.

In the illustrative embodiment, the sealing portion 934 of the pressure-activated seal 910 forms a radially-outwardly opening channel 935 that receives high pressure gas from the high pressure zone HP as shown in FIG. 5. The sealing portion 934 of the exemplary embodiment forms a U-shaped cross sectional profile but may have other shapes that define the channel 935. The sealing portion 934 of the illustrative embodiment also pushes an optional rope seal 970 located in the gap 915 into contact with the axially-extending leg 942 of the attachment feature 946 included in the second component 912. The support portion 932 may be coupled to the component 911 by nickel paste, braze, or by mechanical coupling such that the only flow path extends past the optional rope seal 970.

Adjacent components in a turbine engine sometimes have a small gap which can be sealed to prevent leakage. Ideally, such a seal has enough compliance to account for changes in the gap dimension to manufacturing tolerance and varying cycle point conditions. Rope seals are one particular type of seal that is often considered, however, one drawback is their lack of compliance in some configurations. This lack of compliance can make the seal less effective when accounting for relative motion between the components. Metal spring seals can also be used, but due to the high temperature environment for ceramic matrix composite (CMC) applications, the spring stiffness may creep out over time. The pressure activated seals of the present disclosure make use of the pressure differential that exists across the interface where the seal is desired to activate and engage an effective seal.

The pressure activated seals of the present disclosure may be utilized in the hot section of a turbine engine where a rope seal or spring seal would typically be considered. It may be used to seal between two similar or dis-similar materials including, but not limited to, ceramic matrix composite (CMC), monolithic ceramic, metal alloy, or other materials.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly adapted to be arranged between a high pressure zone and a low pressure zone within a gas turbine engine, the assembly comprising a first component comprising metallic materials formed to include an axially extending seal-support slot, a second component comprising ceramic-matrix composite materials arranged adjacent to the first component to form a radially extending gap therebetween, and a pressure-activated seal comprising a sheet of material having a generally uniform thickness shaped to form a support portion that extends into the seal-support slot of the first component and a sealing portion arranged in the gap between the first component and the second component, wherein the sealing portion is shaped to be pushed by high pressure gas on one side of the gap into contact with the second component to resist flow through the gap, wherein the sealing portion of the pressure-activated seal forms a radially-outwardly opening channel that receives high pressure gas from the high pressure zone and wherein the support portion of the pressure-activated seal forms an axially opening channel facing the gap that receives high pressure gas from the high pressure zone.

2. The assembly of claim 1, wherein the sealing portion of the pressure-activated seal has a generally U-shaped cross sectional profile.

3. The assembly of claim 1, wherein the support portion of the pressure-activated seal has a U-shaped cross sectional profile.

4. The assembly of claim 1, wherein the support portion of the pressure-activated seal is shaped to be pushed by the high pressure gas in the high pressure zone into contact with the seal-support slot of the first component to couple the pressure-activated seal to the first component and to resist flow through the gap.

5. The assembly of claim 1, wherein the first component is formed to include a body and an attachment feature extending radially inward from the body and wherein the second component is formed to include a panel that separates the high pressure zone from the low pressure zone shielding the first component from the low pressure zone and an attachment feature engaging the attachment feature of the first component to couple the second component and the first component.

6. The assembly of claim 5, wherein the gas turbine engine assembly further includes a compliant load pad arranged between the attachment feature of the second component and the attachment feature of the first component.

7. The assembly of claim 6, wherein the compliant load pad is more compliant than one of the first component and the second component.

8. The assembly of claim 7, wherein the compliant load pad is configured to block chemical interaction of the first component and the second component during operation of the gas turbine engine when temperatures are elevated.

9. A gas turbine engine assembly comprising a first component formed to include a seal-support slot, a second component arranged adjacent to the first component to form a gap therebetween, and a pressure-activated seal including a support portion that extends into the seal-support slot of the first component and a sealing portion arranged in the gap between the first component and the second component, wherein the sealing portion of the pressure-activated seal forms a primarily radially-outwardly opening channel to open toward a high pressure zone when assembled in an engine, and wherein the support portion of the pressure-activated seal forms a primarily axially opening channel facing the gap that receives high pressure gas from the high pressure zone.

10. The assembly of claim 9, wherein the sealing portion of the pressure-activated seal has a generally U-shaped cross sectional profile that forms the radially-outwardly opening channel.

11. The assembly of claim 9, wherein the sealing portion of the pressure-activated seal cooperates with a portion of the first component to define the radially-outwardly opening channel.

12. The assembly of claim 9, wherein the support portion of the pressure-activated seal has a U-shaped cross sectional profile.

13. The assembly of claim 9, wherein the support portion of the pressure-activated seal is shaped to be pushed by the high pressure gas in the high pressure zone into contact with the seal-support slot of the first component to couple the pressure-activated seal to the first component and to resist a flow of gas through the gap.

14. The assembly of claim 9, wherein the first component is formed to include a body and an attachment feature extending radially inward from the body and wherein the second component is formed to include a panel that separates the high pressure zone from the low pressure zone shielding the first component from the low pressure zone and an attachment feature engaging the attachment feature of the first component to couple the second component and the first component.

15. The assembly of claim 14, wherein the gas turbine engine assembly further includes a compliant load pad arranged between the attachment feature of the second component and the attachment feature of the first component.

16. The assembly of claim 15, wherein the compliant load pad is more compliant than one of the first component and the second component.

17. The assembly of claim 15, wherein the seal-support slot is formed in the attachment feature included in the first component that engages the attachment feature of the second component to couple the first component to the second component.

* * * * *